United States Patent [19]

Morita et al.

[11] Patent Number: 5,691,401
[45] Date of Patent: *Nov. 25, 1997

[54] CURABLE RESIN COMPOSITIONS CONTAINING SILICA-COATED MICROPARTICLES OF A CURED ORGANOSILOXANE COMPOSITION

[75] Inventors: Yoshitsugu Morita; Atsushi Sasaki, both of Chiba, Japan

[73] Assignee: Dow Corning Toray Silicone Co., Ltd., Tokyo, Japan

[*] Notice: The term of this patent shall not extend beyond the expiration date of Pat. No. 5,492,945.

[21] Appl. No.: 444,178

[22] Filed: May 18, 1995

[30] Foreign Application Priority Data

May 27, 1994 [JP] Japan .................................. 6-138263

[51] Int. Cl.$^6$ .................................................. C08K 9/00
[52] U.S. Cl. .................... 523/435; 523/443; 524/493; 524/588; 524/594; 524/600; 525/431; 525/474; 525/476; 525/477
[58] Field of Search .................................... 523/435, 443; 524/493, 600, 588, 594; 525/431, 476, 474, 477

[56] References Cited

U.S. PATENT DOCUMENTS

| | | | |
|---|---|---|---|
| 4,663,397 | 5/1987 | Morita et al. | 525/398 |
| 4,778,860 | 10/1988 | Morita et al. | 525/431 |
| 4,880,882 | 11/1989 | Morita et al. | 525/446 |
| 4,911,974 | 3/1990 | Shimizu et al. | 428/143 |
| 4,985,277 | 1/1991 | Shimizu et al. | 427/180 |
| 5,387,624 | 2/1995 | Morita et al. | 523/220 |
| 5,391,594 | 2/1995 | Romensko et al. | 523/212 |
| 5,492,945 | 2/1996 | Morita et al. | 523/212 |

FOREIGN PATENT DOCUMENTS

| | | |
|---|---|---|
| 59-96122 | 6/1984 | Japan . |
| 62-93962 | 4/1987 | Japan . |
| 62-147749 | 7/1987 | Japan . |
| 64-4614 | 1/1989 | Japan . |
| 4-225829 | 8/1992 | Japan . |
| 4348148 | 12/1992 | Japan . |
| 5-25324 | 2/1993 | Japan . |
| 5-39313 | 2/1993 | Japan . |
| 7102075 | 4/1995 | Japan . |

OTHER PUBLICATIONS

Kokai Patent Gazette Publication No. 58–219218(83–z19218) Publication date: 20 Dec. 1983; pp. 133–140 "Heat–curable epoxy resin composition".

*Primary Examiner*—Ralph H. Dean
*Attorney, Agent, or Firm*—Robert L. McKellar

[57] ABSTRACT

The present invention provides curable resin compositions containing finely divided particles of a cured organosiloxane material with microparticles of silica bound to the surfaces of the particles. The particle size of the cured organosiloxane material and the particle size and properties of the silica are within specified limits.

6 Claims, No Drawings

CURABLE RESIN COMPOSITIONS CONTAINING SILICA-COATED MICROPARTICLES OF A CURED ORGANOSILOXANE COMPOSITION

BACKGROUND OF THE INVENTION

1. Field of the Invention

This invention relates to curable resin compositions and cured resins. More particularly, this invention relates to very flowable and easily moldable curable resin compositions filled with particles of a cured organosiloxane material and to the very flexible and highly thermal shock-resistant cured resins obtained by curing these compositions.

2. Background Information

Curable resin compositions have excellent electrical properties, including but not limited to dielectric properties, volume resistivity and breakdown strength, and excellent mechanical properties that include but are not limited to flexural strength, compressive strength and impact resistance. For this reason these resin compositions are used in the very widest range of industries.

When curable resin compositions are used as coatings or adhesives, one finds that they cure into products that are stiff and poorly flexible. These compositions also suffer from a large cure shrinkage, which causes such problems as the generation of gaps between the cured resin and its substrate and cracking in the cured resin itself. Additional problems occur in the application of these compositions as sealing resins for electrical and electronic devices because the resins obtained by curing these compositions have much larger coefficients of thermal expansion (CTE) than electrical and electronic devices. When an electrical or electronic device sealed by such a cured resin is repeatedly subjected to thermal shock, problems can occur such as the development of gaps between the cured resin and the device, the appearance of cracks in the cured resin, and even destruction of the device itself. Device reliability is very substantially degraded as a result of these problems.

Many cured organosiloxane powder-filled curable resin compositions have been disclosed with the goal of improving the flexibility and thermal shock-resistance of subject cured resins. For example, Japanese Patent Application Laid Open [Kokai or Unexamined] Number Sho 58-219218 [219,218/1983] discloses a curable resin composition filled with a cured organosiloxane powder (CSP) that is prepared by grinding cured organosiloxane containing at least 10 weight% linear organopolysiloxane blocks. Japanese Patent Application Laid Open [Kokai or Unexamined] Number Sho 59-96122 [96,122/1984] also discloses a curable resin composition filled with CSP containing at least 10 weight % of linear organopolysiloxane blocks, but in this case the CSP is prepared by spraying a curable organosiloxane composition into a hot gas current to effect cure. Japanese Patent Application Laid Open [Kokai or Unexamined] Numbers Sho 64-4614 [4,614/1989] and Sho 64-51467 [51,467/1989] disclose curable resin compositions filled with CSP fabricated by preparing the water-based dispersion of a curable organosiloxane composition, curing said composition, and then eliminating the water. (0004)

The particles that constitute the CSPs disclosed in Japanese Patent Application Laid Open [Kokai or Unexamined] Numbers Sho 58-219218, Sho 59-96122, Sho 64-4614, and Sho 64-51467 have a strong tendency to aggregate and are also poorly dispersible in curable resins. As a result, the corresponding curable resin compositions exhibit poor flow and molding characteristics and the cured resins obtained from these compositions still exhibit a poor flexibility and poor thermal shock resistance.

Again with the goal of improving the flexibility of the cured resins, curable resin compositions have been proposed that are filled with a powder form of a polymer wherein the particles are coated with (a) an inorganic sol or (b) particles of an ion-exchanger resin (refer to Japanese Patent Application Laid Open [Kokai or Unexamined] Numbers Hei 4-225829 [225,829/1992], Hei 5-39313 [39,313/1993], and Hei 5-25324 [25,324/1993]). Unfortunately, the cured resins obtained by curing these compositions have a poor heat resistance and poor moisture resistance while still exhibiting a poor flexibility.

The inventors achieved the present invention as the result of extensive investigations into the problems described above.

One objective of the present invention is to provide highly flowable and highly moldable curable resin compositions that can be cured to yield very flexible and highly thermal shock-resistant cured resins. A second objective is to provide methods for preparing these curable compositions.

SUMMARY OF THE INVENTION

The objectives of the present invention are achieved by incorporating silica-coated microparticles of organosiloxane elastomers or gels into curable resin compositions. The size of the organosiloxane and silica particles are within specified limits.

DETAILED DESCRIPTION OF THE INVENTION

This invention provides a curable resin composition comprising (I) 100 parts by weight of a curable resin, and (II) from 0.1 to 200 parts by weight of a cured organosiloxane powder comprising (A) cured organosiloxane powder having an average particle diameter of 0.1 to 200 micrometers wherein the surface of the particles constituting said powder contain immobilized microparticles of (B) an amorphous silica that has a surface silanol group density of at least 2 per 100 square angstroms, an average particle diameter not exceeding 1 micrometer, and a BET specific surface area of at least 50 m$^2$/g.

This invention also provides cured resins obtained by curing a curable resin composition of this invention.

The Curable Resin

The curable resin, referred to hereinafter as ingredient (I) of the present compositions, is the base material of the present compositions, and no particular restrictions apply as to its type.

Examples of suitable curable resins include but are not limited to epoxy resins such as bisphenol epoxy resins, phenol novolac epoxy resins, cresol novolac epoxy resins, ortho-cresol novolac epoxy resins, alicyclic epoxy resins, biphenyl epoxy resins, aralkyl epoxy resins, halogenated epoxy resins, triphenolmethane epoxy resins, and naphthol epoxy resins; phenol resins such as phenol novolac resins, cresol novolac resins, naphthol resins, aralkylphenol resins, and triphenol resins; polyimide resins such as bis-maleimide-triazine polyimide resins, wholly aromatic polypyromellitimide-type polyimide resins, polyamino-bis-imide-type polyimide resins, polyamideimide-type polyimide resins, and polyetherimide-type polyimide resins; silicone resins, formaldehyde resins, xylene resins, xylene-formaldehyde resins, ketone-formaldehyde resins, furan resins, urea resins, melamine resins, alkyd resins, unsaturated polyester resins, aniline resins, sulfonamide resins, mixtures of two or more of the preceding curable resins, and copolymeric resins obtained from mixtures containing two or more of the preceding curable resins.

Ingredient (I) preferably comprises at least one type of curable resin selected from epoxy resins, phenol resins, polyimide resins, and silicone resins. The curing mechanism for ingredient (I) is not critical.

Typical curing reactions require heating, ultraviolet radiation, or moisture to achieve curing. The physical state of ingredient (I) at room temperature is likewise not critical. This ingredient can be in the form of a liquid or solid at room temperature.

The cured organosiloxane powder comprising ingredient (II) improves the flexibility and thermal shock resistance of the cured resin obtained by curing the present compositions, and does so without reducing fluidity and moldability. Ingredient (II) comprises particles of an elastomeric or gel type cured organosiloxane material having an average particle diameter of 0.1 to 200 micrometers. Immobilized on the surfaces of these particles is a microparticulate form of amorphous silica having a surface silanol group density of at least 2 per 100 square angstroms, an average particle diameter not exceeding 1 micrometer, and a BET specific surface area of at least 50 $m^2/g$.

The cured organosiloxane material, referred to hereinafter as part (A) of ingredient (II) must have an average particle diameter of 0.1 to 200 micrometers. The silica microparticles, referred to hereinafter as part (B), cannot be acceptably immobilized on the surface of a cured organosiloxane powder having an average particle diameter less than 0.1 micrometer. Curable resin compositions filled with this type of cured organosiloxane material have poor flowability and moldability and the cured resins afforded by the cure of such compositions exhibit a poor flexibility and poor thermal shock resistance.

Cured organosiloxane powder with an average particle size in excess of 200 micrometers is very poorly dispersible in ingredient (I) and the resulting composition also has a very poor flowability. The shape of the particles that constituted part (A) of ingredient (II) is not critical, and may be spherical, flat, or amorphous. A spherical shape is preferred.

The microparticles of silica that constitute part (B) of ingredient (II) must have the following properties: the density of silanol groups on the surface of the microparticles must be at least 2 per 100 square angstroms, the average particle diameter must be no larger than 1 micrometer, and the BET specific surface area must be at least 50 $m^2/g$.

Amorphous silica that fails to fulfill any of these requirements cannot achieve adequate bonding to the surface of the particles of cured organosiloxane material that constitute part (A) of ingredient II.

The shape of the amorphous silica is also not critical, and may be spherical, flat, or amorphous with spherical being preferred.

The amorphous silica microparticles comprising part (B) can be manufactured by dry methods, electric arc methods, or wet methods. The fumed silicas fabricated by dry methods are preferred for their high purity and low content of impurities such as alkali ions and halogen ions.

The silanol group density on the surface of the silia [part(B)] can be calculated, for example, from the BET specific surface area of part (B) and the silanol group content calculated from the amount of hydrogen evolved when part (B) is dried for 3 hours at 120° C. under a vacuum of at least 15 mm Hg and the surface silanol is then reacted with lithium aluminum hydride.

No specific restrictions apply to the method for preparing ingredient (II). The following two methods are provided as examples: (i) first heating a water-based dispersion of parts (A) and (B) and thereafter removing the water from the water-based dispersion, and (ii) subjecting the powder mixture of parts (A) and (B) to a rubbing unification.

The water-based dispersion of parts (A) and (B) used in method (i) can be prepared, for example, by mixing part (B) into a water-based dispersion of part (A) or by mixing a water-based dispersion of part (B) into a water-based dispersion of part (A).

Water-based dispersions of part (A) can be prepared, for example, by first preparing the water-based dispersion of a curable organosiloxane composition and thereafter curing the composition to produce a cured organosiloxane powder.

Curable organosiloxane compositions that can be used to prepare part A of ingredient II are known. Examples of suitable compositions include but are not limited to addition reaction-curing organosiloxane compositions, condensation reaction-curing organosiloxane compositions, organoperoxide-curing organosiloxane compositions, and ultraviolet-curing organosiloxane compositions.

The addition reaction-curing organosiloxane compositions and condensation reaction-curing organosiloxane compositions are preferred for their ease of handling.

The required ingredients for additional curable organosiloxane compositions include (a) an organopolysiloxane containing at least 2 alkenyl groups in each molecule, (b) an organohydrogenpolysiloxane containing at least 2 silicon-bonded hydrogen atoms in each molecule, and (c) a platinum catalyst.

These compositions may contain optional ingredients such as (d) one or more fillers and (e) epoxy-functional or acryl-functional organic compounds.

Ingredient (a) is the base ingredient of addition reaction-curing organosiloxane compositions, and it must contain at least 2 alkenyl radicals in each molecule. The alkenyl radicals are specifically exemplified by vinyl, allyl, propenyl, butenyl, pentenyl, hexenyl, heptenyl, octenyl, nonenyl, and decenyl. The vinyl radical is particularly preferred. The non-alkenyl silicon-bonded organic groups in ingredient (a) are specifically exemplified by monovalent hydrocarbon radicals, including but not limited to alkyl such as methyl, ethyl, propyl, and butyl; cycloalkyl such as cyclopentyl and cyclohexyl; aryl such as phenyl, tolyl and xylyl; aralkyl such as benzyl, phenethyl, and 3-phenylpropyl; and haloalkyl groups such as 3-chloropropyl and 3,3,3-trifluoropropyl. Of these radicals, methyl and phenyl are particularly preferred.

The molecular structure of ingredient (a) is not critical and is exemplified by straight-chain, cyclic, network, and partially branched straight-chain structures and by mixtures of the preceding. Ingredient (a) is preferably straight chain in order to obtain gel-like or rubbery properties for this ingredient.

Ingredient (a) should have a viscosity at 25° C. that permits formation of a water-based dispersion of the addition reaction-curing organosiloxane composition. Suitable viscosities range from 1 centipoise to the viscosity of the high-viscosity gums. The viscosity of ingredient (a) at 25° C. is preferably from 20 to 100,000 centipoise, most preferably from 20 to 10,000 centipoise. (0018)

Ingredient (b) is a cross-linker for addition reaction-curing organosiloxane compositions, and must contain at least 2 silicon-bonded hydrogen atoms in each molecule. The silicon-bonded organic groups in ingredient (b) are selected from the same group of non-alkenyl radicals that can be present in ingredient (a).

The molecular structure of ingredient (b) is not critical and is exemplified by straight-chain, cyclic, network, and partially branched straight-chain structures and by mixtures of the preceding. Ingredient (b) should have a viscosity at 25° C. that permits the formation of a water-based dispersion of subject addition reaction-curing organosiloxane compositions. This viscosity is preferably from 1 to 10,000 centipoise.

Ingredient (b) should be added to subject addition reaction-curing organosiloxane compositions in a quantity sufficient to induce the cure of said compositions. In specific terms, ingredient (b) is preferably added at 0.3 to 100 parts by weight per 100 parts by weight ingredient (a).

Ingredient (c) of the addition reaction-curing organosiloxane compositions is a catalyst that accelerates or promotes curing of the compositions by accelerating the addition reaction between the alkenyl groups in ingredient (a) and the silicon-bonded hydrogen atoms in ingredient (b). Any of the well-known platinum catalysts can be used as ingredient (c). Suitable catalysts included but are not limited to chloroplatinic acid, alcohol solutions of chloroplatinic acid, olefin/chloroplatinic acid complexes, chloroplatinic acid/alkenylsiloxane complexes, platinum black, and platinum supported on silica.

The concentration of ingredient (c) should be sufficient to accelerate curing of the composition. In specific terms, the concentration of ingredient (c) is preferably equivalent to from $1 \times 10^{-7}$ to $1 \times 10^{-3}$ parts by weight platinum metal per 100 parts by weight of ingredient (a).

Filler (d) can be added as an optional ingredient to addition reaction-curing organosiloxane compositions for purposes such as adjusting the fluidity of these compositions and improving the mechanical strength of the resulting cured organosiloxane powder. Examples of ingredient (d) include but are not limited to reinforcing fillers such as precipitated silica, fumed silica, calcined silica, and fumed titanium oxide; and by non-reinforcing fillers such as quartz powder, diatomaceous earth, aluminosilicates, iron oxide, zinc oxide and, calcium carbonate.

Ingredient (d) can be directly blended into the present addition reaction-curing organosiloxane compositions, or it can also be added after being treated with a hydrophobicizing organosilicon compound such as hexamethyldisilazane, trimethylchlorosilane or a silanol-terminated polydimethylsiloxane.

An epoxy-functional organic compound or aryl-functional organic compound may also be present as an optional ingredient on for the purpose of improving the affinity and bonding between the cured organosiloxane powder and the organic resin. The epoxy-functional organic compounds encompassed by ingredient (e) are specifically exemplified by allyl glycidyl ether, vinylcyclohexene monoxide, glycidyl acrylate, and glycidyl methacrylate, and by the following.

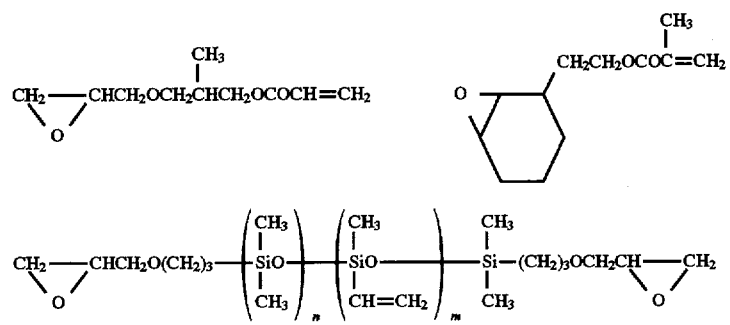

(n and m are positive integers)

The aryl-functional organic compounds encompassed by ingredient (e) are specifically exemplified by the following.

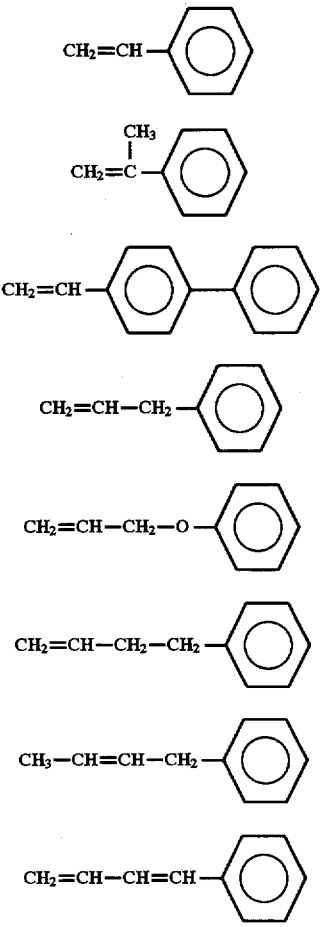

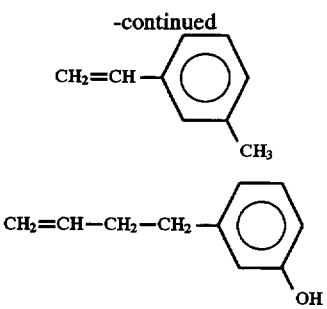

Ingredient (e) can be added together with ingredients (a), (b), and (c), or it can first be reacted with ingredient (b). Ingredient (e) should be added to the present organosiloxane compositions in a quantity that will yield an excellent affinity by the resulting cured material for organic resins.

In specific terms, ingredient (e) is preferably added at 0.1 to 50 parts by weight per 100 parts by weight of ingredient (a).

Small quantities of an addition-reaction inhibitor may be added to the present addition reaction-curing organosiloxane compositions to adjust their cure rate. These addition-reaction inhibitors are exemplified by acetylenic compounds, hydrazine compounds, triazole compounds, phosphine compounds, mercaptan compounds, and so forth.

The present compositions can also contain pigments, heat stabilizers, flame retardants, photosensitizers, and diorganopolysiloxanes with alkenyl radicals at only one molecular chain terminal.

The ingredients of organosiloxane compositions that cure by a condensation reaction include (a') an organopolysiloxane containing silanol groups at both molecular chain terminals, hereinafter referred to as a silanol-endblocked organopolysiloxane, (b) an organohydrogenpolysiloxane containing at least 2 silicon-bonded hydrogen atoms in each molecule, and (c') a condensation-reaction catalyst.

As optional ingredients, these compositions may also contain (d) one or more fillers and (e') at least one silane coupling agent.

Ingredient (a'), which is the base ingredient of the condensation reaction-curing organosiloxane compositions, is a silanol-endblocked organopolysiloxane. The silicon-bonded organic groups in ingredient (a') are specifically exemplified by monovalent hydrocarbon radicals, which include but are not limited to alkyl radicals such as methyl, ethyl, propyl and butyl; alkenyl radicals such as vinyl, allyl, propenyl, butenyl, pentenyl, hexenyl and decenyl; cycloalkyl radicals such as cyclopentyl and cyclohexyl; aryl radicals such as phenyl, tolyl, and xylyl; aralkyl groups such as benzyl, phenethyl, and 3-phenylpropyl; and haloalkyl radicals such as 3-chloropropyl and 3,3,3-trifluoropropyl.

The molecular structure of ingredient (a') is not critical and is exemplified by straight-chain, cyclic, network, and partially branched straight-chain structures and by mixtures of these structures. Ingredient (a') is preferably straight chain in order to obtain gel-like or rubbery properties for part A of ingredient II.

Ingredient (a') should have a viscosity at 25° C. that permits formation of a water-based dispersion of the condensation reaction-curable organosiloxane compositions. Specifically, the viscosity of this ingredient will range from 1 centipoise to the viscosity of the high-viscosity gums, preferably from 20 to 100,000 centipoise, and most preferably from 20 to 10,000 centipoise.

Ingredient (b) is the crosslinking agent for condensation reaction-curing organosiloxane compositions, and comprises an organohydrogenpolysiloxane containing at least 2 silicon-bonded hydrogens in each molecule. This ingredient is the same as ingredient (b) described in the preceding section of this specification for the addition reaction-curing organosiloxane compositions.

Ingredient (b) should be added to the condensation reaction-curing organosiloxane compositions in a quantity sufficient to achieve adequate crosslinking of the compositions. In specific terms, the concentration of ingredient (b) is preferably from 0.3 to 100 parts by weight per 100 parts by weight of ingredient (a').

Ingredient (c') of the condensation curable compositions is a catalyst that promotes curing of the compositions by accelerating the condensation reaction between the silanol groups in ingredient (a') and the silicon-bonded hydrogen atoms in ingredient (b).

Examples of suitable catalysts include but are not limited to metal salts of organic acids such as dibutyltin dilaurate, dibutyltin diacetate, tin octanoate, dibutyltin dioctoate, tin laurate, ferric stannooctanoate, lead octanoate, lead laurate, and zinc octanoate; organotitanium compounds such as tetrabutyl titanate, tetrapropyl titanate and dibutoxytitanium bis(ethyl acetoacetate); and platinum compounds such as chloroplatinic acid, alcohol solutions of chloroplatinic acid, chloroplatinic acid/olefin complexes, chloroplatinic acid/alkenylsiloxane complexes, platinum black, and platinum supported on silica.

The catalyst should be added to the condensation reaction-curing organosiloxane compositions in a quantity sufficient to accelerate curing of these compositions. In specific terms, the concentration of catalyst is preferably from 0.01 to 10 parts by weight per 100 parts by weight ingredient (a').

One or more fillers, referred to as ingredient (d), can optionally be added to condensation reaction-curing organosiloxane compositions to adjust the viscosity of the compositions and improve the mechanical strength of the resulting CSP. Suitable fillers are discussed in the preceding section of this specification relating to addition-curable organosiloxane compositions.

Silane coupling agents and derivatives thereof, referred to in this specification as ingredient (e'), can optionally be present to improve the affinity and bonding between the cured particles of organosiloxane material and organic resins. Ingredient (e') is specifically exemplified by vinyltrimethoxysilane,
vinyltriethoxysilane,
vinyl-tris(2-methoxyethoxy) silane,
vinyltriacetoxysilane,
3-chloropropyltrimethoxysilane,
3-aminopropyltrimethoxysilane,
3-aminopropyltriethoxysilane,
3-(2-aminoethyl)aminopropyltrimethoxysilane,
3-mercaptopropyltrimethoxysilane,
3-glycidoxypropyltrimethoxysilane,
2-(3,4-epoxycyclohexyl)ethyltrimethoxysilane,
3-methacryloxypropyltrimethoxysilane,
3-aminopropylmethyldimethoxysilane, and
3-glycidoxypropylmethyldimethoxysilane.

The concentration of ingredient (e') should be sufficient to generate an excellent affinity between the cured organosiloxane particles and the organic resins that can be used as ingredient I of the present compositions. The concentration of ingredient (e') is preferably from 0.1 to 50 parts by weight per 100 parts by weight ingredient (a').

Other ingredients that can be present in condensation reaction-curing organosiloxane compositions of this invention on an optional basis are pigments, heat stabilizers, flame retardants, photosensitizers, and diorganopolysiloxanes with a silanol group at only one molecular chain terminal.

One method for preparing a water-based dispersion containing an addition- or condensation-curable organosiloxane composition consists of dispersing the curable composition in water or an aqueous surfactant solution and then generating a homogeneous dispersion by the action of a suitable device such as a homogenizer or colloid mill; or a mixing device such as an ultrasonic vibrator.

A surfactant is preferably present during preparation of the water-based dispersion of curable organosiloxane composition for the purposes of obtaining excellent dispersion stability and reducing the average particle diameter of the organosiloxane composition. Suitable surfactants include but are not limited to non-ionic surfactants such as polyoxyalkylene alkyl ethers, polyoxyalkylene alkylphenyl ethers, polyoxyalkylene alkyl esters, polyoxyalkylene sorbitan esters, polyethylene glycols, polypropylene glycols, diethylene glycol, and the ethylene oxide adducts of trimethylnonanol; anionic surfactants such as hexylbenzenesulfonic acid, octylbenzenesulfonic acid, decylbenzenesulfonic acid, dodecylbenzenesulfonic acid, cetylbenzenesulfonic acid, myristylbenzenesulfonic acid, and the sodium salts of these acids; and cationic surfactants such as octyltrimethylammonium hydroxide, dodecyltrimethylammonium hydroxide, hexadecyltrimethylammonium hydroxide, octyldimethylbenzylammonium hydroxide, decyldimethylbenzylammonium hydroxide, dioctadecyldimethylammonium hydroxide, beef tallow trimethylammonium hydroxide, and cocotrimethylammonium hydroxide.

Mixtures of two or more of these surfactants can be used. More particularly, even smaller average particle diameters for the curable organosiloxane composition in the water-based dispersion can be obtained through the use of a preferred mixture of surfactants comprising two non-ionic surfactants wherein the HLB of one is less than 10, the HLB of the other is at least 10, and the difference between their HLB values is at least 5.

The concentration of surfactant is not critical, and is typically from 0.1 to 20 parts by weight per 100 parts by weight of curable organosiloxane composition, preferably from 0.5 to 8 parts by weight per 100 parts by weight curable organosiloxane composition.

The amount of water used to form the dispersion is not critical, however the use of 40 to 2,000 parts, preferably from 40 to 1000 parts, by weight of water per 100 parts by weight of curable organosiloxane composition is desirable.

It becomes difficult to prepare water-based dispersions of the present curable compositions using less than 40 parts by weight water per 100 parts by weight of curable organosiloxane composition, while the yield of particles decreases when the amount of water exceeds 2,000 parts by weight per 100 parts by weight of curable composition.

The water used to prepare the dispersion preferably has a low concentration of metal and halide ions. An electrical conductivity below 1 micromhos/cm is preferred, and ion-exchanged water with an electrical conductivity below 0.5 micromhos/cm is even more preferred.

A water-based dispersion of finely divided cured organosiloxane material is obtained by heating the dispersed curable composition or by allowing the dispersion to remain at room temperature. The heating temperature preferably does not exceed 100° C. and is preferably from 40° C. to 95° C.

Methods for heating the water-based curable organosiloxane composition dispersion include applying heat to the water-based dispersion and adding hot water to the dispersion.

The average diameter of the cured organosiloxane particles used to prepare the resin compositions of this invention is from 0.1 to 200 micrometers, preferably from 0.5 to 80 micrometers. The amorphous silica microparticles cannot be acceptably immobilized on the surface of the organosiloxane particles when the average diameter of the cured particles is below 0.1 micrometer. The flowability and dispersibility of the cured organosiloxane powder are substantially reduced when the average particle diameter exceeds 200 micrometers.

In accordance with method (i), the microparticulate form of silica, referred to as ingredient (B), or a water-based dispersion of part (B) is blended with the water-based dispersion of the curable resin particles, referred to as ingredient (A), to obtain a water-based dispersion of ingredients (A) and (B).

Part (B) can be homogeneously dispersed in water because it is in the form of amorphous microparticles of silica with a surface silanol group density of at least 2 per 100 square angstroms, an average particle diameter not exceeding 1 micrometer, and a BET specific surface area of at least 50 $m^2/g$.

In accordance with method (i), the amount of silica added is sufficient to become immobilized on the surface of the particles of curable organosiloxane composition that constitute part (A), and will depend upon the particle size of the silica, [part (B)].

The amount of silica present is typically from 0.05 to 30 parts by weight per 100 parts by weight of part (A), preferably from 0.1 to 30 parts by weight per 100 parts by weight of part (A).

The amount of part (B) is preferably from 1 to 15 parts by weight per 100 parts by weight part (A) when the average particle diameter of part (A) is from 0.1 to 10 micrometers. This amount of part (B) is from 0.5 to 10 parts by weight per 100 parts by weight part (A) when the average particle diameter of part (A) is from 10 to 200 micrometers.

The next step of method (i) is to heat the water-based dispersion of parts (A) and (B), which causes the particles of silica to become immobilized on the surface of the particles of part (A) by the interaction in the water of the silanol groups on the surface of the silica with the functional groups such as silanol, silicon- bonded hydrogen, and silicon-bonded alkoxy located on the surface of part (A).

The heating temperature used in this step of method (i) is not critical, but is preferably from 40° C. to 95° C., most preferably from 60° C. to 90° C.

The final step of method (i) is removal of the water from the water-based dispersion of parts (A) and (B) to yield a particulate form of cured organosiloxane [part (A)] bearing microparticles of silica [part (B)] immobilized on the surface of the cured organosiloxane particles.

Techniques for removing the water from this water-based dispersion include but are not limited to drying in an air current and drying in devices such as a vacuum dryer, hot-air convection oven or spray dryer.

The microparticles of silica used in method (ii) can be prepared by removing the water, from a water-based dispersion of part (A). Techniques for preparing the dispersion and removing the water are described in preceding sections of this specification.

Examples of techniques for achieving a blend of parts (A) and (B) by subjecting the mixture to a rubbing action are exemplified by the action of devices such as a ball mill, Henschel mixer, stirred mill, Ross mixer, planetary mixer, two-roll mill, or a motorized orbiting mortar and pestle mixer.

Use of Henschel mixers, stirred mills, and motorized orbiting mortars and pestles are preferred because they employ relatively high rotational speeds or a high rubbing unification effect.

The amount of part (B) added using method (ii) is sufficient to immobilize the silica on the surface of the particles of curable composition that constitute part (A), and will depend upon the average particle size of part (A). In specific terms, this amount is preferably from 0.05 to 30 parts by weight, most preferably from 0.1 to 30 parts, by weight of part (B) per 100 parts by weight part (A).

The concentration of part (B) is preferably from 1 to 15 parts by weight per 100 parts by weight part (A) when the average particle diameter of part (A) is from 0.1 to 10 micrometers, and the concentration of part (B) is preferably from 0.5 to 10 parts by weight per 100 parts by weight part (A) when the average particle diameter of part (A) is from 10 to 200 micrometers.

When a mixture of parts (A) and (B) is subjected to rubbing unification in accordance with method (ii), part (B) becomes strongly immobilized or bound on the surface of part (A) through the interaction of the surface silanol of part (B) with functional groups (e.g., silanol, silicon-bonded hydrogen, silicon-bonded alkoxy, etc.) on the surface of part (A).

No specific limitations apply to the temperature during the unification by rubbing together particles that constitute parts (A) and (B).

Part (B) is tightly immobilized on the surface of part (A) in the silia-coated cured organosiloxane particles referred to as ingredient (II) of the present compositions. A characteristic feature of ingredient (II) is that it will not readily shed or release the immobilized particles of silica, even when subjected to shearing forces. The strength of the immobilization of part (B) on the surface of part (A) can be tested and confirmed simply by subjecting ingredient (II) to high shearing forces in a medium such as water or organic solvent.

Ingredient (II) has little tendency to undergo aggregation or blocking and contains very little secondary aggregate. As a result, it will not clog or obstruct processing equipment such elements as hoppers, during storage, exhibits an excellent flowability and in particular exhibits an excellent dispersibility in ingredient (I).

The concentration of ingredient (II) is from 0.1 to 200 parts by weight per 100 parts by weight of curable resin composition, referred to as ingredient (I). The cured resin has poor flexibility and thermal shock resistance when the concentration of ingredient (II) is less than 0.1 weight part per 100 parts by weight of ingredient (I).

At the other end of the concentration range, the fluidity and moldability of the corresponding curable resin composition decline when more than 200 parts by weight of ingredient (II) are present for each 100 parts by weight of ingredient (I).

The curable resin compositions of the present invention may contain optional ingredients in addition to the ingredients already described above. These optional ingredients include but are not limited to curing agents; cure accelerators; fillers; flame retardants such as bromine compounds and antimony oxide, and coupling agents such as silanes and titanium compounds; mold-release agents such as the metal salts of higher fatty acids and so forth; waxes such as polyesters, carnauba wax, and the like; photosensitizers; plasticizers; pigments and dyes; inorganic and organic ion scavengers; ageing inhibitors; and plasticizers such as polybutadiene and polystyrene.

Curing agents that can be blended into curable resin compositions according to the present invention are specifically exemplified by organic acids such as carboxylic acids and sulfonic acids and by their anhydrides; organic hydroxy compounds; organosilicon compounds bearing functional groups such as silanol, silicon-bonded alkoxy, and silicon-bonded halogen; and amine compounds such as primary and secondary polyamines. These curing agents can also be used in combinations of two or more.

Cure accelerators that can be present in the curable resin compositions of this invention are specifically exemplified by carboxylic acids; phenol compounds; alcohols; tertiary amine compounds; reaction mixtures prepared from amine compounds and Lewis acids; and organometallic compounds, such as those of aluminum and zirconium; organophosphorus compounds, such as phosphine, and reaction mixtures prepared from phosphine and Lewis acids; heterocyclic amines; boron complex compounds; organoammonium salts; organosulfonium salts; and organoperoxides.

Fillers that can be present in the curable resin compositions of this invention are specifically exemplified by fibrous fillers such as glass fiber, asbestos, alumina fiber, ceramic fiber based on alumina + silica, boron fiber, zirconia fiber, silicon carbide fiber, metal fibers, polyester fibers, aramide fibers, nylon fibers, phenol fibers, and plant- and animal-derived natural fibers; and by granular and particulate fillers such as fused silica, precipitated silica, fumed silica, calcined silica, zinc oxide, fired clay, carbon black, glass beads, alumina, talc, calcium carbonate, clay, aluminum hydroxide, barium sulfate, titanium dioxide, aluminum nitride, silicon carbide, magnesium oxide, beryllium oxide, kaolin, mica, zirconia, and particulate forms of cured resins. Moreover, mixtures of two or more of these fillers can be used.

No specific limitations apply to methods for preparing curable resin compositions according to the present invention. Preparation can be carried out, for example, by mixing ingredients (I), (II) and any optional ingredients in a device such as a ball mill, Henschel mixer, stirred mill, Ross mixer, planetary mixer, two-roll mill, motorized orbiting mortar and pestle mixer, and so forth. The Henschel mixer, stirred mill, and motorized orbiting mortar and pestle mixer are preferred. Organic solvents may be used as vehicles for preparing curable resin compositions according to the present invention.

Examples of suitable solvents include but are not limited to aromatic organic solvents such as toluene, xylene, and so forth, and aliphatic hydrocarbon solvents such as hexane, heptane, and so forth.

With regard to the temperature to which the curable resin composition is exposed during processing in the aforementioned devices, heating the compositions from 60° C. to 95° C. is preferred. Curable resin compositions according to the present invention may be ground after their preparation.

Methods for curing the resin compositions of the present invention will now be explained in detail.

Depending upon the type of reaction used to cure the resin portion of the present compositions, these compositions can be cured at room temperature or heating, by exposure to ultraviolet radiation, or by exposure to moisture.

Heat curable resin compositions can be cured by transfer molding, injection molding, or casting. These compositions are preferably cured at 100° C. to 300° C. and are preferably also subjected to a post-cure at 100° C. to 300° C.

The curable compositions of the present invention are very flowable and highly moldable, and they cure to yield resins that are very flexible and have excellent thermal shock resistance. These compositions can therefore be used as sealants for electrical and electronic devices such as IC's, LSI's, transistors and diodes.

EXAMPLES

The following examples describe preferred curable resin compositions and cured resins of this invention, and should not be interpreted as limiting the scope of accompanying claims. Unless otherwise specified all parts and percentages are by weight and the reported viscosity values were measured at 25° C. The properties of the cured organosiloxane powders, curable resin compositions, and cured resins were measured using the following procedures.

Properties of the cured organosiloxane particles

The average diameter of the cured organosiloxane powders were determined using an image processor connected to an optical microscope.

The fluidity of the cured organosiloxane powders was determined by pouring 50 g of cured organosiloxane particles of a size passing through a 40 mesh screen from a height of 20 cm and measuring the angle of repose exhibited by particles.

Aggregation of the cured organosiloxane powders was determined using an air-jet sieve from the Alpine Company and calculating the percentage of material retained on a 325 mesh screen wherein the space between the wires of the screen was 44 micrometers.

Blocking of the cured organosiloxane particles was determined by placing 100 g of the particles in a tube with a cross section of 10 cm×10 cm, applying a load of 1 kgf to the exposed surface of the particles while orienting the tube in a vertical direction. After standing for 2 days, the load was removed and the sample was divided into 10 portions. Using an air-jet sieve from the Alpine Company, a 10 g portion of the cured organosiloxane powder was passed through 150 mesh screen over 5 minutes, and the weight percentage of material remaining on the screen was measured.

Dispersibility of the cured organosiloxane powders was determined by placing a mixture of 1 g of the cured organosiloxane powder and 50 mL of toluene in a 100 mL-capacity mayonnaise bottle equipped with a lid. The bottle was shaken 50 times and then allowed to stand for 10 hours. Aggregation of the cured organosiloxane powder was then measured using an image processor connected to an optical microscope.

Silica separation ratio for the cured silicone powders 2.0 g of cured organosiloxane powder and 100 mL acetone were stirred for 10 minutes at 4,000 rpm in a homogenizer, and the cured organosiloxane powder was thereafter separated by filtration. The cured organosiloxane powder was then washed with acetone, dried in an air current, and added to 50 mL brine solution exhibiting a specific gravity of 1.3. This blend was mixed for 10 minutes at 4,000 rpm using a homogenizer and then centrifuged. The amount of silica precipitating as the lower layer was measured, and this weight is reported as a percentage of the silica input for the cured organosiloxane powder.

Sodium and halogen ion concentrations in the cured organosiloxane powders 2.0 g of cured organosiloxane powder and 50 g ion-exchanged water exhibiting an electrical conductivity of 0.4 micromhos/cm were introduced into a pressure cooker and heated at 121° C. for 20 hours to extract ionic impurities present in the cured organosiloxane powder into the water. The sodium and halogen ion concentrations in this aqueous extract were measured by ion chromatography.

Properties of the curable resin compositions

Spiral flow of the curable resin compositions was evaluated based on the method specified in the EMMI standard.

Molding shrinkage of the curable resin compositions was measured by the method specified in JIS K-6911. The curable resin composition was cured for 3 minutes at 175° C. and was then post-cured for 3 hours at 150° C.

Properties of the cured resins

The coefficient of thermal expansion (CTE) of the cured resins was measured by the method specified in JIS K-6911.

The flexural modulus of the cured resins was measured by the method specified in JIS K-6911.

Determining Thermal Shock Resistance

Twenty resin-sealed semiconductor devices were molded using chips with a diameter of 36 mm$^2$, and a package thickness of 2.0 mm. The moldings were then subjected to heat cycle testing during which the temperature was varied from −196° C. to +150° C. over a one minute interval. After 150 cycles the surface of the resin was inspected with a stereoscopic microscope. The number of moldings in which cracking had appeared in the surface was counted and scored using the following scale:

+=5 or less; x=6 to 10, and x x=11 or more

Determining Moisture Resistance

Twenty resin-sealed semiconductor devices were molded using chips with a diameter of 36 mm$^2$ and a package thickness of 2.0 mm. After being connected to a suitable electrical source the devices were heated for 500 hours in saturated steam (2 atom, 121° C.). After heating, the number of broken aluminum wires in the devices was determined. The number of moldings in which was counted and scored using the following scale:

+=5 or less; x=6 to 10; and x x=11 or more.

Reference Example 1

The following ingredients were blended to homogeneity at −10° C.:

50 parts by weight dimethylvinylsiloxy-endblocked dimethylpolysiloxane exhibiting viscosity to 800 centipoise, a vinyl equivalent weight of 8,000, a sodium ion concentration≦2 ppm, and a halogen ion concentration≦5 ppm;

11 parts by weight dimethylsiloxane-methylhydrogensiloxane copolymer exhibiting a viscosity of 20 centipoise, a sodium ion concentration≦2 ppm, a halogen ion concentration≦5 ppm and the formula

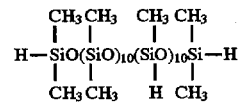

2 parts by weight allyl glycidyl ether, and 2 parts by weight vinylcyclohexene monoxide.

The resultant composition was blended to homogeneity at 5° C. with 50 parts by weight of the dimethylvinylsiloxy-endblocked dimethylpolysiloxane described earlier in this example and a quantity of isopropanolic chloroplatinic acid solution equivalent to 20 ppm platinum metal based on the total amount of dimethylvinylsiloxy-endblocked dimethylpolysiloxane.

Into the resulting blend were rapidly mixed 200 parts by weight of pure water at 25° C. (conductivity=0.2 micromhos/cm) and 4 parts by weight polyoxyethylene nonylphenyl ether (HLB=13.1).

The mixture was then passed through a homogenizer under a pressure of 300 kgf/cm$^2$ to yield a homogeneous water-based dispersion of a curable organosiloxane composition. This was held at 30° C. for 6 hours, which resulted in curing of the organosiloxane composition and production of a water-based dispersion of cured organosiloxane particles with an average diameter of 3 micrometers and a perfectly spherical shape. 5 parts by weight fumed silica exhibiting a surface silanol group density of 4.2 per 100 square angstroms, a primary particle diameter of 20 millimicrons, and a BET specific surface area of 200 m$^2$/g was subsequently added to the water-based cured organosiloxane powder dispersion.

After blending the ingredients to homogeneity, the resultant dispersion was then heated for 1 hour at 80° C. The resulting water-based dispersion of cured organosiloxane powder and fumed silica was dried in a spray dryer to yield 110 parts by weight cured organosiloxane powder recovered from the cyclone separator.

Reference Example 2

The procedure of Reference Example 1 was followed, with the exception that the fumed silica used in Reference Example 1 was replaced with a dimethyldichlorosilane-hydrophobicized fumed silica exhibiting a surface silanol group density of 1.2 per 100 square angstroms, a primary particle diameter of 20 millimicrons, and a BET specific surface area of 120 m$^2$/g. 105 parts by weight of cured organosiloxane powder was recovered.

When the hydrophobicized fumed silica was added to the aqueous dispersion of cured organosiloxane particles, silica floated on the surface of the water-based dispersion and a homogeneous water-based dispersion could not be prepared. In addition, the hydrophobicized fumed silica could not be recovered from the cyclone separator during spray drying of the water-based dispersion of cured organosiloxane powder and hydrophobicized fumed silica. Instead, microparticles that was discharged in the form of a white cloud were collected using a Venturi scrubber, and identified as hydrophobicized fumed silica.

Reference Example 3

Fumed silica exhibiting a surface silanol group density of 4.2 per 100 square angstroms, a primary particle diameter of 20 millimicrons, and a BET specific surface area of 200 m$^2$/g was added to a water-based curable organosiloxane composition dispersion as described in Reference Example 1 to yield a water-based dispersion containing a curable organosiloxane composition and fumed silica. This water-based dispersion was held for 7 hours at 25° C., at which time an attempt was made to dry the dispersion using a spray dryer. It was found that uncured curable organosiloxane composition had precipitated and drying could not be carried out.

Reference Example 4

A curable organosiloxane composition was prepared from 50 parts by weight dimethylvinylsiloxy-endblocked dimethylpolysiloxane exhibiting a viscosity of 400 centipoise, a vinyl equivalent weight of 5,400, a sodium ion concentration≦2 ppm, and a halogen ion concentration≦5 ppm);

1.5 parts by weight of a trimethylsiloxy-endblocked methylhydrogenpolysiloxane exhibiting a viscosity of 20 centipoise, a silicon-bonded hydrogen equivalent weight of 67, a sodium ion concentration≦2 ppm, and a halogen ion concentration≦5 ppm;

7.5×10$^{-3}$ parts by weight tetramethyltetravinylcyclotetrasiloxane; and a quantity of isopropanolic chloroplatinic acid solution equivalent to 120 ppm platinum metal based on the total weight of the dimethylvinylsiloxy-endblocked dimethylpolysiloxane.

0.25 parts by weight of polyoxyethylene nonylphenyl ether (HLB=5.7) was added to this curable organosiloxane composition.

Into the resulting mixture was then added dropwise, over a period of approximately 5 minutes while stirring, an aqueous solution composed of 1 weight part polyoxyethylene octylphenyl ether (HLB=18.1) and 10 parts by weight pure water with a conductivity of 0.2 micromhos/cm. After stirring for approximately 1 hour at 600 rpm, the mixture was passed through a colloid mill to produce a thick water-based dispersion of the curable organosiloxane composition. This water-based dispersion was introduced into sufficient pure water to provide 50 weight percent of organosiloxane ingredient in the water-based curable organosiloxane composition dispersion. Thorough stirring yielded a homogeneous water-based dispersion of the curable organosiloxane composition.

The organosiloxane composition was then cured by maintaining the aqueous dispersion containing the water-based curable organosiloxane composition under ambient conditions overnight. The resultant water-based dispersion of cured organosiloxane particles had an average diameter of 1 micrometer and a perfectly spherical shape.

50 parts by weight of a 10% water-based dispersion of fumed silica exhibiting a surface silanol group density of 4.2 per 100 square angstroms, a primary particle diameter of 20 millimicrons, and a BET specific surface area of 200 m$^2$/g was added to the water-based dispersion of cured organosiloxane particles with stirring to homogeneity. Heating for 1 hour at 70° C. yielded a water-based dispersion of cured organosiloxane powder +fumed silica. This dispersion was dried in a spray dryer, yielding approximately 58 parts by weight cured organosiloxane particles recovered from the cyclone apparatus.

Reference Example 5

Particles of a cured organosiloxane composition were prepared as in Reference Example 4, but in this case omitting the fumed silica that was used in Reference Example 4.

Reference Example 6

50 parts by weight of cured organosiloxane particles were prepared by the procedure in Reference Example 4, but in this instance replacing the fumed silica used in Reference Example 4 with 27 parts by weight, equivalent to 20 weight percent, of colloidal silica with an average particle diameter of 30 millimicrons and a sodium ion concentration of 0.03 percent.

Reference Example 7

A curable organosiloxane composition was prepared by blending to homogeneity 50 parts of a silanol-endblocked dimethylpolysiloxane exhibiting a viscosity 40 centipoise, a hydroxyl equivalent weight of 450, and a sodium ion concentration≦2 ppm, a halogen ion concentration≦5 ppm;

4.0 parts by weight trimethylsiloxy-endblocked methylhydrogenpolysiloxane exhibiting a viscosity of 20 centipoise, a silicon-bonded hydrogen equivalent weight of 67, a sodium ion concentration≦2 ppm, and a halogen ion concentration≦5 ppm), and 0.75 parts by weight dibutyltin dilaurate.

While maintaining this curable organosiloxane composition at 10° C., it was mixed into 250 parts by weight of pure water exhibiting a conductivity of 0.2 micromhos/cm, and 3 parts by weight polyoxyethylene nonylphenyl ether exhibiting an HLB value of 13.1. The resultant mixture was passed through a homogenizer to yield a homogeneous water-based dispersion of the curable organosiloxane composition. This dispersion was held at 25° C. for 10 hours to cure the organosiloxane composition. The particles of cured organosiloxane had an average diameter of 2 micrometers and a perfectly spherical shape.

8 parts by weight of fumed silica exhibiting a surface silanol group density of 2.5 per 100 square angstroms, a primary particle diameter of 10 millimicrons were added to this aqueous dispersion of cured organosiloxane particles with stirring to homogeneity. Heating the dispersion at 60° C. for 30 minutes yielded an aqueous dispersion of cured organosiloxane particles and fumed silica. Drying this dispersion in a spray dryer resulted yielded 55 parts by weight of cured organosiloxane particles recovered from the cyclone separator.

Reference Example 8

10 parts by weight of fumed silica exhibiting a surface silanol group density of 4.2 per 100 square angstroms, a primary particle diameter of 20 millimicrons, and a BET specific surface area of 200 m²/g were blended into 100 parts by weight of cured organosiloxane particles prepared as described in Reference Example 5. The resultant mixture was then stirred with an automatic mortar over a period of 5 hours to yield a cured organosiloxane powder.

TABLE 1

| | Ref. Ex. 1 | Ref. Ex. 2 | Ref. Ex. 4 | Ref. Ex. 5 | Ref. Ex. 6 | Ref. Ex. 7 | Ref. Ex. 8 |
|---|---|---|---|---|---|---|---|
| average particle diameter (micrometers) | 3 | 3 | 1 | 1.5 | 4 | 2 | 2 |
| aggregation (%) | <0.1 | 52 | <0.1 | 58 | <0.1 | <0.1 | 8 |
| blocking (%) | 0.1 | 2 | 0.1 | 90 | 5 | 0.1 | 0.1 |
| sodium concentration (ppm) | 0.3 | 0.8 | 0.5 | 0.5 | 35 | 1.0 | 0.8 |
| halogen concentration (ppm) | 5 | 10 | 7 | 8 | 17 | 10 | 11 |
| angle of repose (degrees) | 32 | 55 | 34 | 61 | 32 | 30 | 34 |
| dispersibility (mm) | <0.5 | 5 | <0.5 | 9 | <0.5 | <0.5 | 1.5 |
| silica separation ratio (%) | 11 | 99–100 | 5 | — | 85 | 2 | 19 |

Example 1

The following ingredients were mixed to homogeneity: 100 parts by weight phenol novolac resin exhibiting a softening point of 80° C., hydroxyl equivalent weight of 100; 20 parts by weight cured organosiloxane powder prepared in Reference Example 1;

185.7 parts by weight fused quartz powder;

11.4 parts by weight hexamethylenetetramine;

1.0 weight part 3-glycidoxypropyltrimethoxysilane, and 2.9 parts by weight carnauba wax.

Kneading the resultant mixture on a hot roll at 90° C. and cooling then yielded a curable resin composition of the present invention. This curable resin composition was subsequently ground and transfer molded for 3 minutes at 175° C. under a pressure of 70 kgf/cm². The cured resin was then post-cured for 2 hours at 150° C.

The properties of the curable resin composition and the cured resin obtained therefrom are reported in Table 2.

Comparative Example 1

A comparative curable resin composition outside the scope of the present invention was prepared using the procedure described in Example 1, but replacing the cured organosiloxane powder of Reference Example 1 used in Example 1 with 20 parts by weight of an epoxy-functional organopolysiloxane with the following formula.

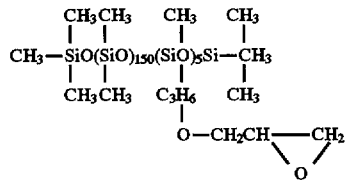

An attempt was made to transfer mold this curable resin composition as described in Example 1, but its cure did not develop to an adequate degree, with the result that the composition remained sticky and adherent and could not be de-molded. The properties of the cured resin could therefore not be measured.

Comparative Example 2

A comparative cured resin composition outside the scope of the present invention was prepared by following the procedure described in Example 1, but in this case omitting the cured organosiloxane powder of Reference Example 1 that was used in Example 1. The properties of the curable resin composition and the cured resin obtained therefrom are reported in Table 2.

TABLE 2

| | present invention Ex.1 | comparative examples | |
|---|---|---|---|
| | | Comp. Ex. 1 | Comp. Ex. 2 |
| properties of the curable resin compositions | | | |
| spiral flow (inches) | 29 | >60 | 31 |
| mold shrinkage (%) | 0.05 | could not be measured | 0.31 |

TABLE 2-continued

|  | present invention Ex.1 | comparative examples Comp. Ex. 1 | Comp. Ex. 2 |
|---|---|---|---|
| properties of the cured resins |  |  |  |
| flexural modulus (kgf/cm$^2$) | 920 | could not be measured | 1350 |
| CTE (× 10$^{-5}$/°C.) | 0.6 | could not be measured | 1.5 |

Example 2

The following ingredients were mixed to homogeneity: 15 parts by weight cured organosiloxane powder prepared as described in Reference Example 1;

284.6 parts by weight fused quartz powder;

3.5 parts by weight aluminum acetylacetonate;

1.0 weight part 3-glycidoxypropyltrimethoxysilane;

3.8 parts by weight carnauba wax; and 100 parts by weight of a organosiloxane-epoxy resin consisting of 50 parts by weight ortho-cresol novolac epoxy resin exhibiting a softening point of 60° C. and an epoxy equivalent weight of 220 and 50 parts by weight organosiloxane resin exhibiting a silicon-bonded hydroxyl group content of 5 weight percent and consisting essentially of 40 mole percent $CH_3SiO_{3/2}$ units, 10 mole percent $C_6H_5(CH_3)SiO_{2/2}$ units, 40 mole percent $C_6H_5SiO_{3/2}$ units, and 10 mole percent $(C_6H_5)_2SiO_{2/2}$ units. Kneading this mixture on a hot roll at 90° C. and cooling the resultant mixture yielded a curable resin composition of the present invention. This curable resin composition was subsequently ground and transfer molded for 2 minutes at 175° C. under a pressure of 70 kgf/cm$^2$. The resultant cured resin was post-cured for 12 hours at 180° C. The properties of the curable resin composition and the cured resin obtained therefrom are reported in Table 3.

Example 3

A curable resin composition of the present invention was prepared according to the procedure described in Example 2, but in this case using the cured organosiloxane powder prepared in Reference Example 7 in place of the cured organosiloxane powder of Reference Example 1. The properties of this curable resin composition and the cured resin obtained therefrom are reported in Table 3.

Example 4

A curable resin composition of the present invention was prepared according to the procedure described in Example 2, but in this case using the cured organosiloxane powder prepared in Reference Example 8 in place of the cured organosiloxane powder of Reference Example 1 The properties of this curable resin composition and the cured resin obtained therefrom are reported in Table 3.

Comparative Example 3

A comparative curable resin composition outside the scope of the present invention was prepared according to the procedure described in Example 2, but in this case using the cured organosiloxane powder prepared in Reference Example 2 in place of the cured organosiloxane powder of Reference Example 1. The properties of this curable resin composition and the cured resin obtained therefrom are reported in Table 3.

Comparative Example 4

A comparative curable resin composition outside the scope of the present invention was prepared according to the procedure described in Example 2, but in this case omitting the cured organosiloxane powder of Reference Example 1 that was used in Example 2. The properties of this curable resin composition and the cured resin obtained therefrom are reported in Table 3.

TABLE 3

|  | present invention | | | comparative examples | |
|---|---|---|---|---|---|
|  | Ex. 2 | Ex. 3 | Ex. 4 | Comp. Ex. 3 | Comp. Ex. 4 |
| properties of the curable resin compositions |  |  |  |  |  |
| spiral flow (inches) | 34 | 32 | 33 | 21 | 35 |
| properties of the cured resins |  |  |  |  |  |
| flexural modulus (kgf/cm$^2$) | 980 | 1000 | 950 | 1040 | 1520 |
| CTE (× 10$^{-5}$/°C.) | 1.5 | 1.5 | 1.4 | 1.6 | 2.8 |
| moisture resistance | + | + | + | + | xx |
| thermal shock resistance | + | + | + | + | xx |

Example 5

The following ingredients were mixed to homogeneity:

100 parts by weight bismaleimide-triazine-type heat-curing polyimide resin;

23 parts by weight cured organosiloxane powder prepared in Reference Example 4;

233 parts by weight fused quartz powder;

3.3 parts by weight carnauba wax;

2.0 parts by weight 3-glycidoxypropyltrimethoxysilane, and 1.0 part by weight aluminum benzoate.

Kneading this mixture on a hot roll at 90° C. and cooling then yielded a curable resin composition according to the present invention. This curable resin composition was subsequently ground and transfer molded for 4 minutes at 220° C. under a pressure of 70 kgf/cm$^2$. The cured resin was post-cured for 3 hours at 230° C. The properties of the curable resin composition and the cured resin obtained therefrom are reported in Table 4.

Comparative Example 5

A comparative curable resin composition outside the scope of the present invention was prepared according to the procedure described in Example 5, but in this case using the cured organosiloxane particles prepared in Reference Example 2 in place of the cured organosiloxane particles of Reference Example 4.

The properties of this curable resin composition and the cured resin obtained therefrom are reported in Table 4.

Comparative Example 6

A comparative curable resin composition outside the scope of the present invention was prepared according to the procedure described in Example 5, but in this case omitting the cured organosiloxane powder of Reference Example 4 that was used in Example 5. The properties of this curable resin composition and the cured resin obtained therefrom are reported in Table 4.

TABLE 4

|  | present invention | comparative examples | |
| --- | --- | --- | --- |
|  | Example 5 | Comp. Ex. 5 | Comp. Ex. 6 |
| properties of the curable resin compositions | | | |
| spiral flow (inches) | 46 | 38 | 40 |
| mold shrinkage (%) | 0.24 | 0.31 | 0.49 |
| properties of the cured resins | | | |
| flexural modulus (kgf/cm$^2$) | 950 | 980 | 1350 |
| CTE (× 10$^{-5}$/°C.) | 1.5 | 1.5 | 1.8 |

Example 6

The following ingredients were mixed to homogeneity: 75 parts by weight of a ortho-cresol novolac epoxy resin exhibiting a softening point of 60° C. and an epoxy equivalent weight of 220;

35 parts by weight of a phenol novolac resin exhibiting a softening point of 80° C. and a hydroxyl equivalent weight of 100;

26 parts by weight of cured organosiloxane particles prepared as described in Reference Example 1;

260 parts by weight fused quartz powder;

1.0 weight part carnauba wax;

1.0 weight part 3-glycidoxypropyltrimethoxysilane; and 0.6 weight part triphenylphosphine.

Kneading the resultant mixture on a hot roll at 90° C. and cooling yielded a curable resin composition according to the present invention. This curable resin composition was subsequently ground and transfer molded for 3 minutes at 175° C./70 kgf/cm$^2$. The cured resin was post-cured for 5 hours at 180° C. The properties of the curable resin composition and the cured resin obtained therefrom are reported in Table 5.

Example 7

A curable resin composition of the present invention was prepared according to the procedure described in Example 6, but in this case using the cured organosiloxane powder prepared in Reference Example 4 in place of the cured organosiloxane powder of Reference Example 1. The properties of this curable resin composition and the cured resin obtained therefrom are reported in Table 5.

Comparative Example 7

A comparative curable resin composition outside the scope of the present invention was prepared according to the procedure described in Example 6, but in this case using the cured organosiloxane particles prepared as described in Reference Example 6 in place of the cured organosiloxane particles described in Reference Example 1 that was used in Example 6. The properties of this curable resin composition and the cured resin obtained therefrom are reported in Table 5.

Comparative Example 8

A comparative curable resin composition outside the scope of the present invention was prepared according to the procedure described in Example 6, but in this case omitting the cured organosiloxane particles described in Reference Example 1 that were used in Example 6. The properties of this curable resin composition and the cured resin obtained therefrom are reported in Table 5.

TABLE 5

|  | present invention | | comparative examples | |
| --- | --- | --- | --- | --- |
|  | Example 6 | Example 7 | Comp. Ex. 7 | Comp. Ex. 8 |
| properties of the curable resin compositions | | | | |
| spiral flow (inches) | 51 | 48 | 47 | 58 |
| properties of the cured resins | | | | |
| flexural modulus (kgf/cm$^2$) | 960 | 1020 | 980 | 1350 |
| CTE (× 10$^{-5}$/°C.) | 2.3 | 2.4 | 2.5 | 2.9 |
| moisture resistance | + | + | xx | xx |
| thermal shock resistance | + | + | + | xx |

That which is claimed is:

1. A curable resin composition comprising (I) 100 parts by weight of a curable resin, and (II) 0.1 to 200 parts by weight of particles comprising (A) particles of a cured organosiloxane composition having an average diameter of 0.1 to 200 micrometers, wherein said particles have immobilized on the surfaces thereof (B) amorphous silica microparticles exhibiting a surface silanol group density of at least 2 per 100 square angstroms, an average particle diameter not exceeding 1 micrometer, and a BET specific surface area of at least 50 m$^2$/g.

2. A curable resin composition according to claim 1, wherein ingredient (I) comprises at least 1 kind of curable resin selected from epoxy resins, phenol resins, polyimide resins, and organosiloxane resins.

3. A curable resin composition according to claim 1, wherein ingredient (II) is prepared by first heating a water-based dispersion comprising an organosiloxane composition curable by an addition or condensation reaction as ingredient and said microparticles as ingredient (B), wherein said dispersion is heated sufficiently to cure said organosiloxane composition, and then removing the water from said dispersion.

4. A curable resin composition according to claim 1, wherein ingredient (II) consists essentially of particles obtained by the rubbing unification of a mixture of ingredients (A) and (B).

5. A curable resin composition according to claim 3, wherein from 0.05 to 30 parts of ingredient (B) is blended with 100 parts of ingredient (A).

6. A cured resin prepared by curing the curable composition of claim 1.

* * * * *